United States Patent
Lindgren et al.

(10) Patent No.: US 8,230,074 B2
(45) Date of Patent: Jul. 24, 2012

(54) SYSTEM AND METHOD FOR REDUCING REQUIRED MEMORY USAGE BETWEEN COMMUNICATION SERVERS

(75) Inventors: Anders Lindgren, Älvsjö (SE);
Christer Boberg, Tungelsta (SE);
Susanna Sjöholm, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1562 days.

(21) Appl. No.: 11/674,861

(22) Filed: Feb. 14, 2007

(65) Prior Publication Data
US 2008/0008185 A1   Jan. 10, 2008

Related U.S. Application Data

(63) Continuation-in-part of application No. 11/559,203, filed on Nov. 13, 2006.

(60) Provisional application No. 60/806,656, filed on Jul. 6, 2006.

(51) Int. Cl.
*G06F 15/16* (2006.01)

(52) U.S. Cl. ...................................... 709/227

(58) Field of Classification Search .................. 709/227, 709/204
See application file for complete search history.

(56) References Cited

U.S. PATENT DOCUMENTS

| | | | |
|---|---|---|---|
| 2002/0087729 A1* | 7/2002 | Edgar | 709/246 |
| 2004/0003046 A1* | 1/2004 | Grabelsky et al. | 709/206 |
| 2005/0286504 A1* | 12/2005 | Kwon | 370/356 |
| 2006/0187855 A1* | 8/2006 | Booth et al. | 370/254 |
| 2009/0092131 A1* | 4/2009 | Hu et al. | 370/356 |

OTHER PUBLICATIONS

U.S. Appl. No. 11/559,203, Anders Lindgren, et al.

* cited by examiner

*Primary Examiner* — Jason Recek

(57) ABSTRACT

An arrangement and method for reducing memory usage for communications between servers in a communication network utilizing the Session Initiation Protocol (SIP) by controlling establishment of SIP-Tunnels. A single SIP-Tunnel for a certain event package is utilized for multiple subscriptions between one instance of a requesting server such as a Resource List Server (RLS) and one instance of an Application Server such as, for example, a Presence Server. The SIP-Tunnel is then used to send all SIP NOTIFY messages between these two entities to reduce memory usage at both ends by removing the overhead created by SIP.

13 Claims, 3 Drawing Sheets

SYSTEM AND METHOD FOR REDUCING REQUIRED MEMORY USAGE BETWEEN COMMUNICATION SERVERS

CROSS-REFERENCE TO RELATED APPLICATIONS

This application is a continuation-in-part of U.S. patent application Ser. No. 11/559,203 filed Nov. 13, 2006, which claims benefit of U.S. Provisional Application No. 60/806,656 filed Jul. 6, 2006, the disclosures of which are incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to communication systems. More particularly, and not by way of limitation, the invention is directed to a system and method for reducing memory usage on both ends of a communication between servers in a communication network.

In communication networks utilizing the Session Initiation Protocol (SIP), such as an IP Multimedia Subsystem (IMS) network, a SIP SUBSCRIBE message is used to subscribe to changes of a state belonging to a user in the IMS network. When the User state is changed, a SIP NOTIFY message is sent from a Notifying server to the subscribing user. In the IMS network, due to scaling reasons, there are a number of SIP application servers (ASs) that each serve a number of users in a domain. The allocation of users to a certain instance of an AS is handled by the IMS network, and a Subscribing AS does not know which Notifying AS contains the User state. To find the correct Notifying AS, the Subscribing AS sends the SUBSCRIBE Message to the IMS core network which in turn routes the message to the correct Notifying AS.

According to RFC3265, it is possible to use the existing "id" parameter of the Event-header, in order to have multiple subscriptions in one dialogue. Nevertheless, a large amount of memory is still needed to store SIP dialogues. One reason is that using the "id" parameter means that subscriptions within the same dialogue must share the same watcher and target since there is no way to identify them other than using the To and From headers of the dialogue. So this makes it impossible to use the same dialogue for subscriptions with different watchers and targets. Therefore, a number of SIP dialogues must be set up between a Subscribing AS and a Notifying AS. The dialogues are maintained during the lifetime of the subscription. A dialogue may exist for an extended period of time, even though the number of NOTIFY messages sent may be rather low during the lifetime of the subscription. Still there is often a need to have a NOTIFY message sent in real time. Therefore, a pull-based solution is not preferred.

Examples of states that are handled in this way are Presence and XCAP document changes as defined by IETF, 3GPP, and OMA standards.

The existing solution forces the Subscribing and Notifying ASs to keep one state for the Subscribe dialogue per user and AS. Every dialogue requires some memory usage. Assuming, for example, there are one million users in an IMS domain and 100,000 users allocated per AS, this means that there are ten Subscribing ASs and ten Notifying ASs. If every user is subscribing to one other user, there will be one million SIP dialogues. As an example, if every dialogue requires 2 Kbytes of basic memory per AS, a total of 2 Gbytes of memory will be required for the dialogues. If it is assumed that every user subscribes to ten other users, as can be the case between a Resource List Server (RLS) and a Presence Server (PS), then 20 Gbytes of memory will be required, and so on.

Thus, it can be seen that the number of sessions set up between the RLS and the Presence Server as well as the RLS/PS and different XML Document Management Servers (XDMSs) may be very high, and the more contacts that are used, the more sessions are needed. Memory usage rather than the number of transactions per second is the larger problem in this scenario because the frequency of NOTIFY messages is assumed to be quite low.

What is needed in the art is a system and method for reducing the amount of memory required for storing SIP dialogues. The present invention provides such a system and method.

BRIEF SUMMARY OF THE INVENTION

In one embodiment, the present invention provides a method by which a single SIP tunnel for a certain event package is utilized for multiple subscriptions between one instance of a Resource List Server (RLS) and one instance of an Application Server such as, for example, a Presence Server. The SIP tunnel is then used to send all SIP NOTIFY messages between these two entities to reduce memory usage at both ends by removing the overhead created by SIP.

The invention reduces the number of SIP dialogues needed in the system to support functionality for a SIP SUBSCRIBE exploder such as the RLS. Since each SIP dialogue requires allocation of a significant amount of resources such as memory and disk space, the invention significantly reduces the amount of hardware needed. The invention is particularly valuable in the case of large contact lists where the number of established sessions is very large when utilizing standardized SIP signaling. The invention scales much better than existing solutions, and the size of the contact list does not significantly affect the dimensioning of a system in the same way as the prior art solution.

In one aspect, the present invention is directed to a method of reducing memory usage in first and second servers communicating in a communication network. The method includes establishing a dialogue between instances of the first and second servers; and utilizing the established dialogue to tunnel all Notify messages between the instances of the first and second servers. In this manner, the number of dialogues between the first and second servers is reduced, together with the associated memory usage.

In another aspect, the present invention is directed to a requesting server for providing multiple subscriptions towards multiple application servers. The requesting server includes means for receiving from a user, a Subscribe request requesting subscriptions to multiple resources in a contact list; means for identifying an application server for each of the resources in the contact list; means for sending to the identified application servers, a Subscribe request which includes an indication that the requesting server supports tunneling; and means for receiving a response from one of the identified application servers indicating that the identified application server also supports tunneling. The requesting server also includes means for determining whether the identified application server already has an existing tunnel with the first application server; and logic for determining whether the response message indicates an established tunnel already exists between the requesting server and the identified application server. If an established tunnel does not already exist between the requesting server and the identified application server, the requesting server establishes a new tunnel. If an established dialogue already exists, the requesting server utilizes the existing established tunnel to support the requested subscription.

In another aspect, the present invention is directed to an application server in a communication network for providing a resource to a requesting server through a subscription. The application server includes means for receiving from the requesting server, a subscription request including an indication that the requesting server supports tunneling; and means for determining whether the application server supports tunneling and if so, whether a tunnel already exists between the application server and the requesting server. The application server also includes means for sending a first type of response to the requesting server if the application server does not support tunneling; means for sending a second type of response to the requesting server if the application server supports tunneling and a tunnel already exists between the application server and the requesting server; and means for sending a third type of response to the requesting server if the application server supports tunneling but a tunnel does not already exist between the application server and the requesting server.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

Figure 1:
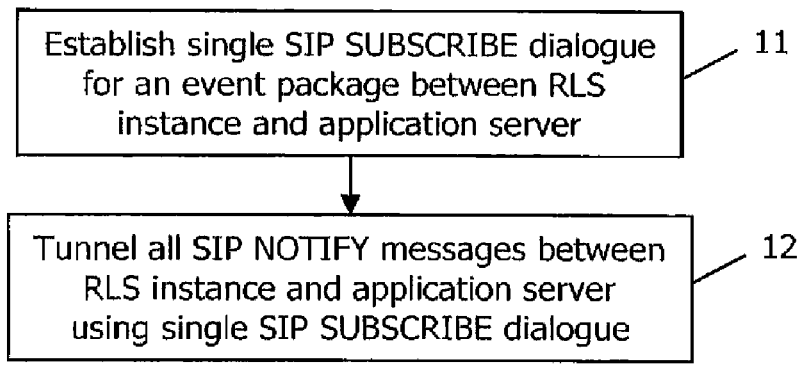
FIG. 1 is a flow chart illustrating the steps of a first exemplary embodiment of the method of the present invention.

FIG. 1 is a flow chart illustrating the steps of a first exemplary embodiment of the present invention. At step 11, a single SIP SUBSCRIBE dialogue is established for a certain event package between one instance of a Resource List Server (RLS) and one instance of an Application Server such as, for example, a Presence Server. At step 12, this dialogue is then used to tunnel all SIP NOTIFY messages between these two entities inside this single dialogue to reduce memory usage at both ends by removing the overhead created by SIP. The invention is generic for any type of SUBSCRIBE exploder and the corresponding NOTIFY servers, or any type of application server having multiple subscriptions towards another application server. This embodiment makes use of the existing SIP protocol with some extensions resulting in a solution that is backwards-compatible with existing "non-tunneling" servers.

The invention reduces the amount of memory used in IMS Networks. One dialogue is utilized per peer of Subscribing AS and Notifying AS. The single dialogue is utilized to tunnel all NOTIFY messages. In the example above, in which there are one million users in an IMS domain and each user subscribes to one other user, there were one million dialogues requiring 2 Gbytes of memory when utilizing existing procedures. The present invention reduces the number of dialogues to only 100 dialogues using 2 Kbytes of basic data each. Thus, a total of only 200 Kbytes of memory is required. For every user dialogue, an extra 0.1 Kbyte is needed. So instead of adding 2 Kbytes per new subscription as in the prior art, the invention adds only 0.2 Kbytes for each new subscription.

Further, the present invention utilizes existing IMS/SIP routing procedures to find the Notifying AS. If a dialogue already exists between these two instances, the invention informs the Subscribing AS that the NOTIFY messages will be sent in the existing "common" dialogue instead of in a separate dialogue for this particular subscription.

The invention may also reduce the number of SIP SUBSCRIBE messages due to refresh procedures because in some cases only one dialogue needs to be refreshed. Consequently, processor resources are also saved.

Figure 2:
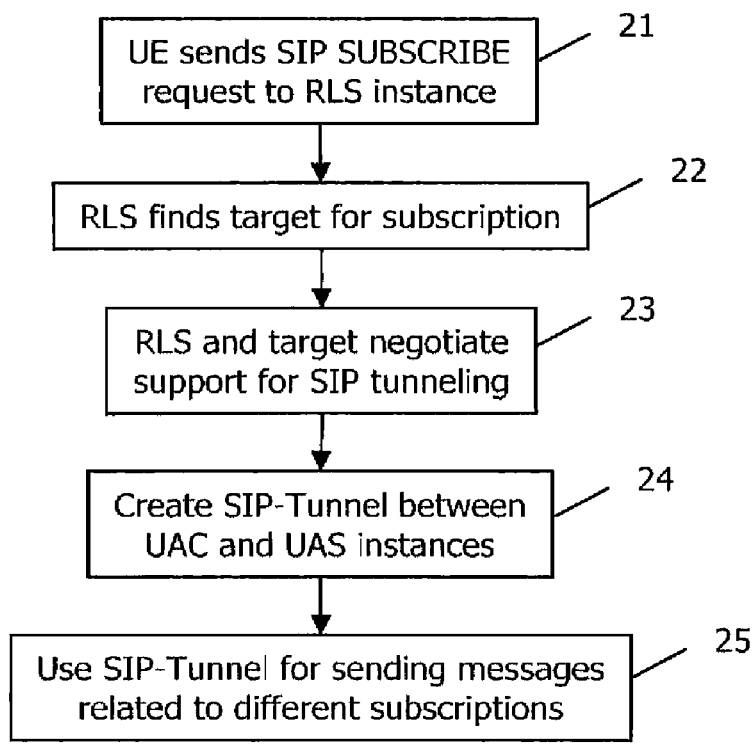
FIG. 2 is a flow chart illustrating the steps of a second exemplary embodiment of the method of the present invention in which a new event package is used to set up a SIP-Tunnel.

FIG. 2 is a flow chart illustrating the steps of a second exemplary embodiment of the present invention in which a new event package is used to set up a SIP-Tunnel. At step 21, a User Equipment (UE) sends a SIP SUBSCRIBE request to an RLS instance requesting the creation of a subscription. At step 22, the RLS finds the target for the subscription, and at step 23, the RLS and the target negotiate support for SIP-tunneling. At step 24, the SIP-Tunnel is created between the User Agent Client (UAC) and the User Agent Server (UAS) instances. At step 25, the SIP-Tunnel is used for sending messages related to different subscriptions.

Figure 3:
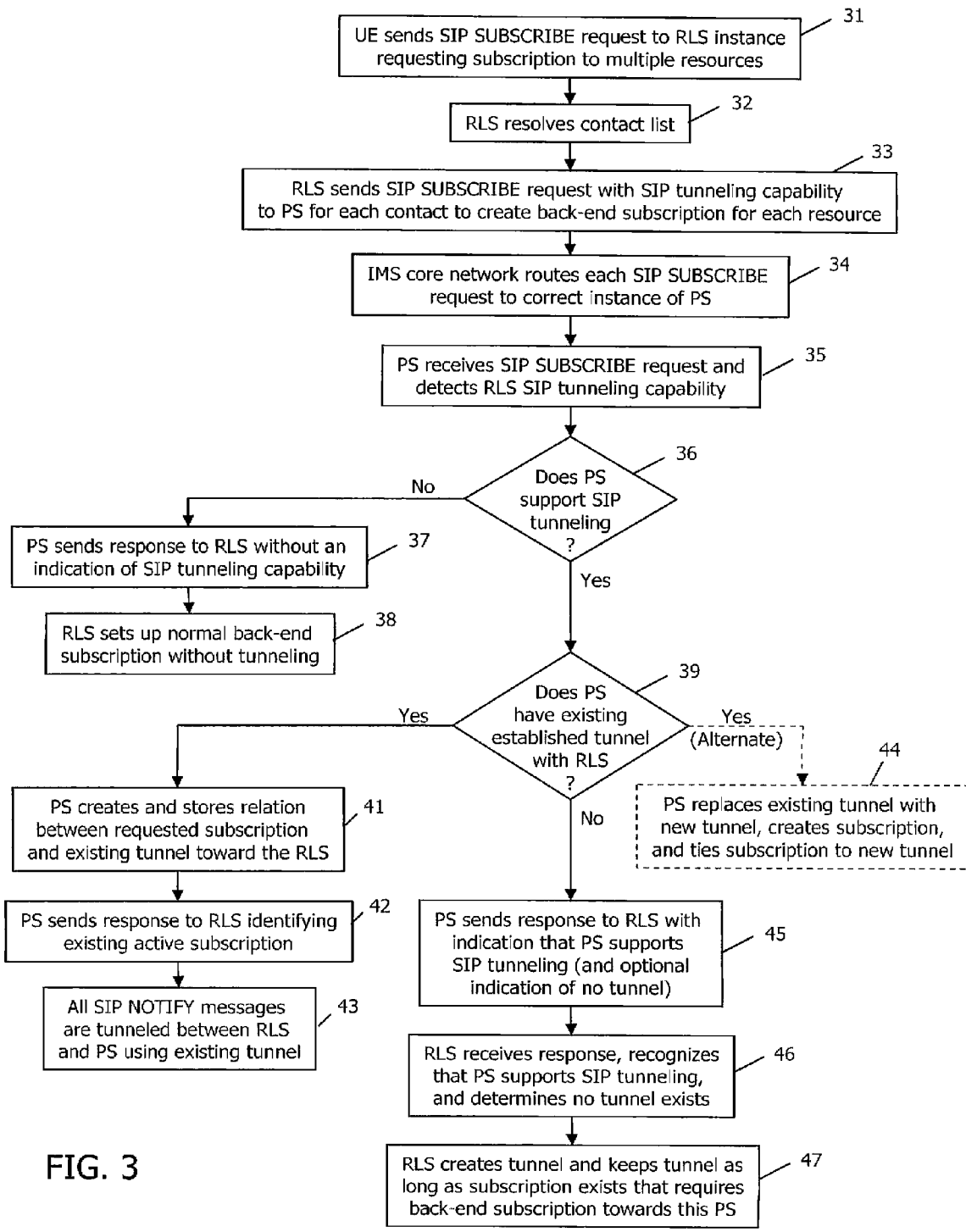
FIG. 3 is a flow chart illustrating the steps of a third exemplary embodiment of the method of the present invention.

FIG. 3 is a flow chart illustrating the steps of a third exemplary embodiment of the method of the present invention. By way of example, the application server is presented as a Presence Server although other types of application servers are equally applicable. At step 31, a UE sends a SIP SUBSCRIBE request to an RLS instance requesting the creation of a subscription to multiple resources by using a specific URI pointing at a contact list. The IMS core network routes the request to the RLS instance where this contact list is to be handled. At step 32, the RLS resolves the requested contact list. At step 33, the RLS instance sends a SIP SUBSCRIBE request to each Presence Server (PS) for the resources in the contact list requesting to create one back-end subscription for each resource in the contact list. The RLS includes information in the request about its capability to support SIP tunneling, and identifies the requesting RLS instance. This information may be, for example, a new header such as "x-sip-tunneling". The negotiation of the actual presence back-end subscription may also be included in the request, in which case the desired expiry time of the subscription and a unique ID for the back-end subscription are also included.

At step 34, the IMS core network routes each SIP SUBSCRIBE request as normal to the correct instance of the PS based on the information in the Request-URI. At step 35, the PS receives the SIP SUBSCRIBE request and detects the RLS capability to support SIP tunneling by examining the "x-sip-tunneling" header. At step 36, it is determined whether the PS also supports SIP tunneling. If the PS does not support SIP tunneling, the method moves to step 37 where the PS sends a response to the RLS indicating that the PS does not support SIP tunneling. For example, the PS may send a response that does not include the "x-sip-tunneling" header. At step 38, the RLS proceeds as normal and sets up a back-end subscription without tunneling. Note that an external PS that does not support SIP tunneling will not recognize the "x-sip-tunneling" header in the SIP SUBSCRIBE request, and therefore will not return the x-sip-tunneling header in its response. Therefore, the RLS will set up a normal back-end subscription.

If it is determined at step 36 that the PS supports SIP tunneling, the method moves to step 39 where the PS determines whether it already has an existing established tunnel with the requesting RLS. This may be done, for example, by checking the "contact" header value in the SIP SUBSCRIBE request and comparing the contact header value with the address of clients for its existing tunnels. If the PS has an existing established tunnel with this RLS, the method moves to step 41 where the PS creates and stores a relation between the requested subscription and the existing established tunnel toward the RLS. At step 42, the PS sends a response to the RLS and includes an indication that an active subscription already exists between the RLS and the PS. The RLS then waits for an initial notification to arrive. At step 43, all SIP NOTIFY messages are tunneled between the RLS and the PS using the existing SIP tunnel.

In an alternative embodiment, if the PS has an existing established tunnel with this RLS, the method moves to step 44 where the PS replaces the existing tunnel with a newly created tunnel. If the new tunnel can be created successfully, the PS also creates the presence subscription based on the included parameters and ties the subscription to the tunnel. The PS returns a 200 OK to the RLS indicating that the tunnel has been created. Preferably, any errors connected with the subscription are sent in the subscription-specific headers to avoid confusing proxies that are not aware of SIP tunneling.

If it is determined at step 39 that the PS does not have an existing established tunnel with this RLS, the PS does not create the subscription since the RLS will create a new SIP-Tunnel and tie a subscription to that tunnel as described below. This subscription is temporary, and is only used for tunnel negotiating and to find the instance of the PS. The method moves to step 45 where the PS returns a response to the RLS indicating that the PS supports SIP tunneling. In one embodiment, the PS returns, for example, a "301 Moved Permanently" message to the RLS including information that sip-tunneling is supported. For example, the PS may include the header "x-sip-tunneling" in the 301 response message to the RLS. The PS may optionally include an indication that a tunnel does not currently exist.

At step 46, the RLS receives the response and recognizes that the PS supports SIP tunneling. The RLS may determine whether a tunnel already exists utilizing the optional information placed in the contact header of the 301 response message by the PS. Alternatively, the response may not include information about the existence of a tunnel. Instead, the RLS may check the contact header against the RLS's existing tunnels. If a tunnel does not already exist, the method moves to step 47 where the RLS creates the tunnel and keeps this tunnel as long as any RLS subscription exists that requires a back-end subscription towards that PS instance (or until the system is restarted). This SUBSCRIBE request is a request to create a presence tunnel using, for example, a new event package called "presence.sip-tunneling". This initial request creates the tunnel and may also include information in the specific headers to create the presence subscription to avoid extra signaling. The "expires" header includes the configured "SIP Tunnel Expires Value".

At this point, both the RLS and the PS have a subscription-dialogue relation between the RLS instance and the PS instance. Any new subscription created between that particular RLS/PS instance pair will use the same established dialogue and corresponding tunnel. Whenever a request related to a subscription is sent, it uses the corresponding tunnel. In this case the standard SIP headers are used for information related to the tunnel, and specific header and body information is used for the information related to the subscription.

If the RLS receives a subscribe refresh request from the client, the RLS proceeds as normal and refreshes the subscription towards the PS. Note that the RLS only refreshes the SIP Tunnel subscription towards the PS if the remaining time of the existing dialogue is shorter than the expiry time of the received subscription. The RLS may handle refresh of the tunnel in different ways such as:

1. Automatic refresh of SIP tunnel—In this solution, the RLS/PS refreshes the SIP tunnel as long as any subscription exists between the RLS and the PS by using a configurable expiration time (which is the same in both the RLS and the PS) but without sending the refresh messages.

2. SIP Tunnel refreshed when subscription is refreshed/created—In this case, the SIP tunnel is refreshed when a back-end subscription is created/refreshed using a configurable expiration time.

3. SIP Tunnel is refreshed explicitly—A separate thread is used in the RLS to refresh the SIP tunnel as long as any back-end subscriptions exist. When the RLS desires to refresh the SIP Tunnel, the RLS does not include the "x-sub-data" header in the Refresh message. However, the x-sub-data header is included when any change occurs in the back-end subscription.

The RLS refreshes the back-end subscription and includes the ID of the specific back-end subscription. If only the SIP tunnel is to be refreshed, the RLS does not include the ID of the specific back-end subscription.

The SIP tunneling function is also very useful when subscribing to XCAP changes, for example, especially if the XDMS and AS are not co-located. The use of timers on the particular subscription may also be avoided, with timers being used only on the SIP tunnel.

It is necessary to have a separate timer for each Presence Subscription because final notifications are required to be sent to the client to indicate that the subscription has been terminated. Otherwise, the memory saving would be much larger and the timer complexity would be reduced. In one embodiment, timers are not used in the PS because the RLS terminates all back-end subscriptions when the subscription times out. A drawback to this approach is that there may be "hanging" subscriptions in the PS. However, a specific clean-up thread may be implemented to remove all subscriptions that have an elapsed expiration time.

The memory savings achieved by the present invention depends on the distribution of the contacts (i.e., presentities) on different addresses (processors). For example, from the RLS point of view, if all contacts are located on the same processor, the greatest memory saving is achieved. There is progressively less savings as more and more of the contacts are located on different processors.

The following sections provide example models. In a request model, the base for the solution is to make use of the existing SIP protocol to find the correct instance of the Presence Server with a few extensions resulting in a solution that is backwards compatible with existing "non-tunneling" servers. A new header called "x-sip-tunneling" is used to negotiate the support for SIP tunneling. Note that it is not allowed to use the supported header for proprietary extensions if it is not part of an RFC. This can, however, be proposed as an extension if needed in the future. The information about the RLS instance (IP-address/port) sending the request is included in the contact header in the subscribe request as normal.

When the instance of the Presence Server is found, the RLS sets up a Tunnel towards that instance of the PS to create a SIP Dialogue using the RLS and PS server addresses as To/From information. Since the information in these messages is different from the standard Presence event package, it is preferable to use a new event package called, for example, "presence.sip-tunneling". The reason for specifying the application is that it may be used for several applications (such as subscriptions from AS to XDMS) and thus it is necessary to point out the correct application.

The information about the specific subscription is included in specific headers of the SIP SUBSCRIBE/SIP NOTIFY request and in the response to these requests. This means that the SIP request includes information that relates to the SIP tunnel as well as information that relates to the individual subscription. In this way, information may be exchanged between the end-point applications (e.g., RLS and PS) without affecting any proxies. It should be noted that a proxy must be able to handle standard routing based on the IP-address/port in the request. The proxy must also be able to handle the new event package. It should also be noted that the request/response always includes the specific "x-sub-data" to identify the specific subscription.

SIP Tunnel Subscribe Requests. The Subscribe request related to a subscription using the tunnel may be either a refresh or a terminate request since initial subscriptions utilize a standard presence subscribe. For the Subscribe request, the RLS uses the received contact address in the Request-URI and To headers. The RLS also includes the contact address of the RLS instance (TP) in the P-Asserted-Identity as well as in the From header. Alternatively, other information may be used in the To, From, and P-Asserted-Identity and then the contact information is used as usual only in the Request-URI and Contact. The Subscribe request also includes a "presence.sip-tunneling" event package, and preferably utilizes a specific header "x-sub-data" to convey all information about the subscription. For example, the X-sub-data header may take the form, "x-sub-data: To=a, From=b, Expires=x, sub-id=y". This provides a more compact format than using one header for each parameter. However, as an alternative, the Subscribe request may include:

(1) specific "x" headers indicating the To and From information for the actual subscription, i.e., the information that was included in the first presence subscription to route the request to the correct PS instance. This information is important, for example, for trouble shooting.

(2) "x-sub-expires" to indicate the desired expiration value for the subscription ("0" if subscription is terminated).

(3) "x-sub-id" indicating the specific subscription.

SIP Tunnel Subscribe Responses. In addition to standard information, the SIP Subscribe response includes specific information for the subscription. Preferably, a specific header "x-sub-data" is utilized to convey all information about the subscription. For example, the x-sub-data header may take the form, "x-sub-data: To=a, From=b, Expires=x, Response-code=xxx sub-id=y". Alternatively, the response may include one header for each parameter such as "x-sub-id" to indicate the related subscription, "x-sub-expires" to indicate the determined time for the subscription, and "x-sub-response" to indicate the response code for the particular subscription.

SIP Tunnel Notify Requests. The Notify request related to a subscription using the tunnel must include specific headers for the subscription so that the tunnel is kept "unaware" of the subscription. The Notify request preferably includes a specific header "x-sub-data" where all information about the subscription is included. For example, the x-sub-data header may take the form, "x-sub-data: To=a, From=b, Sub-state=xxx sub-id=y". Alternatively, the response may include one header for each parameter such as "x-sub-id" to indicate whether the response relates to the subscription or the tunnel, and "x-sub-state" to indicate the status for the presence subscription (Equivalent to Subscription-State). For example, if x-sub-state says "terminated", it indicates for the RLS that the Presence server has terminated the subscription.

The RLS and the PS must still store information unique for each particular subscription that is not directly related to the SIP Tunnel (SIP Dialogue). Depending on how much data is related to the subscription, the amount of memory utilized will differ, but the saving of memory related to the SIP Tunnel is still the same.

Figure 4:
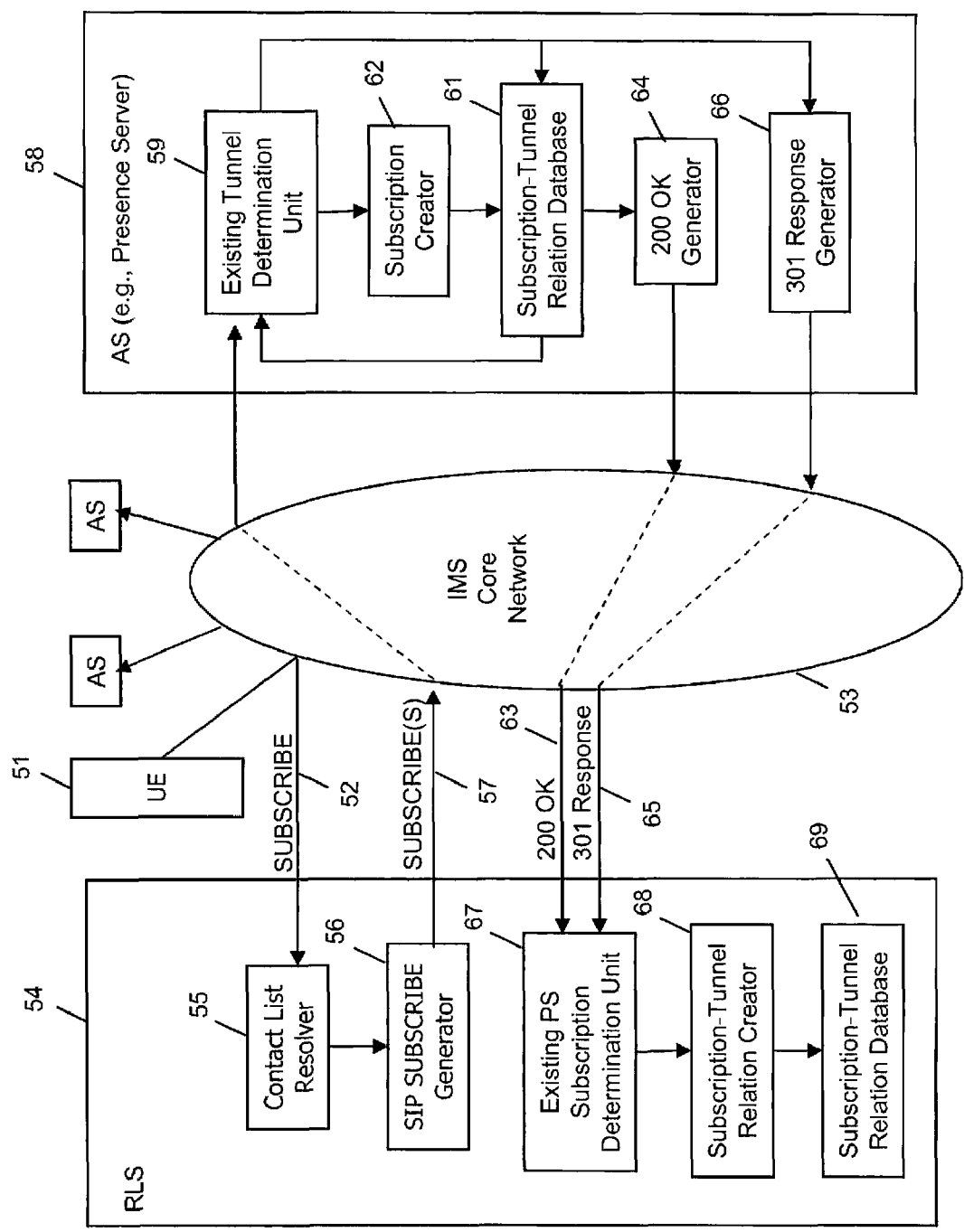
FIG. 4 is a simplified block diagram of an exemplary embodiment of the system of the present invention.

FIG. 4 is a simplified block diagram of an exemplary embodiment of the system of the present invention. User equipment (UE) 51 sends a SIP SUBSCRIBE request message 52 via an IMS core network 53 to an RLS instance 54 requesting the creation of a subscription to multiple resources by using a specific URI pointing at a contact list. A contact list resolver 55 in the RLS resolves the requested list. A SIP SUBSCRIBE generator 56 in the RLS sends SIP SUBSCRIBE requests 57 to the application server for each contact via the IMS core network. By way of example, a Presence Server (PS) 58 is illustrated here. The SUBSCRIBE messages request to create one back-end subscription for each resource in the contact list. The RLS includes information in the request about its ability to support SIP tunneling, and identifies the requesting RLS instance. This information may be, for example, a new value such as "sip-tunneling" in the "supported" header.

The PS 58 receives the SIP SUBSCRIBE request 57 and detects the capability of the RLS 34 to support SIP tunneling by examining the "supported" header. An existing tunnel determination unit 59 in the PS determines whether it already has an existing established tunnel with the requesting RLS by comparing the "contact" header value with the information that is stored in the PS about ongoing subscriptions. This information may be stored in a subscription-tunnel relation database 61. If the PS does not have an existing established tunnel with this RLS, a subscription creator 62 in the PS creates a new subscription. Information about the new subscription is stored in the subscription-tunnel database. The PS may utilize the "contact" header value in the SIP SUBSCRIBE request 57 to identify the RLS instance, and stores information that ties a specific subscription to a specific RLS instance.

The PS 58 returns a response to the RLS 54 via the IMS core network with an ID identifying the new or existing subscription. If the PS did not have an existing established tunnel with the RLS 54, a 200 OK response 63 may be generated by a SIP 200 OK message generator 64. If the PS had an existing established tunnel with the RLS, a 301 response 65 may be generated by a SIP 301 response generator 66.

The RLS 54 receives the response, and an existing PS subscription determination unit 67 in the RLS determines whether a subscription already exists to this PS instance by examining the received response. If a 200 OK response 63 is received, the RLS knows that no subscription exists. If a "301" response 65 is received, the RLS knows that a subscription already exists. If a subscription does not exist, a subscription-tunnel relation creator 68 in the RLS uses the information in the contact header of the 200 OK response message to create a new subscription-tunnel relation towards that particular instance of the PS 58. The RLS stores the subscription-dialogue relation locally in a subscription-tunnel relation database 69 as long as the RLS subscription exists. If a subscription already exists to this instance of the PS, the RLS uses the information in the contact header of the 301 response message to create a subscription-dialogue relation between the incoming RLS subscription and the already existing dialogue towards the PS. The RLS stores the subscription-dialogue relation locally in the subscription-tunnel database 69 as long as the RLS subscription exists.

The RLS also returns a unique ID pointing out the specific subscription-tunnel relation for this particular subscription. This information could be included either in an extra route header or in an additional header used by the RLS internally.

Thereafter, any new subscription created between that particular RLS/PS instance pair will use the same established dialogue.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method of reducing memory usage in first and second servers communicating in a communication network utilizing the Session Initiation Protocol (SIP), said method comprising:
    establishing a SIP dialogue between instances of the first and second servers to support a SIP subscription, wherein the step of establishing the SIP dialogue includes:
        sending a SIP Subscribe request from the first server to the second server requesting that a SIP subscription be established, said SIP Subscribe request including an indication that the first server supports SIP tunneling,
        if the second server also supports SIP tunneling, determining by the second server whether the second server already has an existing SIP tunnel with the first server corresponding to the SIP dialogue,
        if the second server already has an existing SIP tunnel with the first server corresponding to the SIP dialogue, creating a relation between the requested SIP subscription and the existing SIP tunnel, and sending a SIP response from the second server to the first server identifying the relation, and
        if the second server does not have an existing SIP tunnel with the first server corresponding to the SIP dialogue, sending a SIP response from the second server to the first server indicating that the second server supports SIP tunneling, wherein in response, the first server creates a SIP tunnel with the second server corresponding to the SIP dialogue for the requested SIP subscription; and
    utilizing the established SIP dialogue and corresponding established SIP tunnel to tunnel all SIP requests and responses within the SIP subscription between the instances of the first and second servers.

2. A requesting server for providing multiple Session Initiation Protocol (SIP) subscriptions towards multiple application servers, said requesting server is configured to perform the following:
    receive from a user, a SIP Subscribe request requesting SIP subscriptions to multiple resources in a contact list;
    identify an application server for each of the resources in the contact list;
    establish a SIP dialogue with each identified application server to support a corresponding SIP subscription;
    send to the identified application servers, a SIP Subscribe request which includes an indication that the requesting server supports SIP tunneling;
    receive a SIP response from one of the identified application servers indicating that the application server responding with the SIP response also supports SIP tunneling;
    determine whether the responding application server already has an existing SIP tunnel with the requesting server corresponding to the SIP dialogue between the responding and requesting servers;
    determine whether the SIP response message indicates that an established SIP tunnel already exists between the requesting server and the responding application server;
    establish a new SIP tunnel in response to a determination that the response message indicates that an established SIP tunnel does not already exist between the requesting server and the responding application server; and
    in response to a determination that the response message indicates an established SIP tunnel already exists between the requesting and responding servers, utilize the established SIP dialogue and corresponding existing established SIP tunnel between the requesting and responding servers to support all SIP requests and responses within the requested SIP subscription between the requesting and responding servers.

3. The requesting server according to claim 2, further configured to conclude that an established SIP tunnel does not already exist if a first type of response message is received from the responding application server, and to conclude that an established SIP tunnel already exists if a second type of response message is received.

4. The requesting server according to claim 3, wherein the servers communicate over an IP Multimedia Subsystem (IMS) network utilizing the Session Initiation Protocol (SIP), wherein:
    the responding application server is a presence server;
    the requesting server is a Resource List Server;
    the first type of response message is a SIP 200 OK message; and
    the second type of response message is a SIP return code.

5. The requesting server according to claim 3, wherein the servers communicate over an IP Multimedia Subsystem (IMS) network utilizing the Session Initiation Protocol (SIP), wherein:
    the responding application server is an IMS server;
    the requesting server is an IMS Server;
    the first type of response message is a SIP 200 OK message; and
    the second type of response message is a SIP return code.

6. The requesting server according to claim 2, further configured to store a subscription-tunnel relation associating the requested SIP subscription and the responding application server with the existing established SIP tunnel.

7. An application server in a communication network for providing a resource to a requesting server through a Session Initiation Protocol (SIP) subscription, said application server is configured to perform the following:
    receive a SIP subscription request from the requesting server, said SIP subscription request including an indication that the requesting server supports SIP tunneling;

determine whether the application server supports SIP tunneling and if so, whether a SIP tunnel already exists between the application server and the requesting server;

send a first type of SIP response to the requesting server if the application server does not support SIP tunneling;

send a second type of SIP response to the requesting server if the application server supports SIP tunneling and a SIP tunnel already exists between the application server and the requesting server; and send a third type of SIP response to the requesting server if the application server supports SIP tunneling but a SIP tunnel does not already exist between the application server and the requesting server, wherein the first, the second, and the third types of SIP responses are different from one another.

8. The application server according to claim 7, wherein, as part of sending the a first type of SIP response, the application server is further configured to inform the requesting server that the application server does not support SIP tunneling, thereby informing the requesting server to set up a SIP subscription without SIP tunneling.

9. The application server according to claim 7, wherein, as part of sending the second type of SIP response, the application server is further configured to inform the requesting server of a relation between the requested SIP subscription and the existing SIP tunnel, thereby causing the existing SIP tunnel to be utilized to send all subsequent SIP requests between the requesting server and the application server.

10. The application server according to claim 7, wherein, as part of sending the third type of SIP response, the application server is further configured to inform the requesting server that the application server supports SIP tunneling but a SIP tunnel does not already exist, thereby causing the requesting server to create a SIP tunnel and to utilize the SIP tunnel to send all subsequent SIP requests between the requesting server and the application server.

11. The application server according to claim 7, wherein the communication network is an IP Multimedia Subsystem (IMS) network and the servers communicate utilizing the Session Initiation Protocol (SIP), wherein:

the application server is a presence server;

the requesting server is a Resource List Server;

the SIP subscription request message is a SIP SUBSCRIBE message;

the third type of SIP response message is a SIP 200 OK message; and the second type of SIP response message is a SIP return code.

12. The application server according to claim 7, wherein the servers communicate over an IP Multimedia Subsystem (IMS) network utilizing the Session Initiation Protocol (SIP), wherein:

the application server is an IMS server;

the requesting server is an IMS Server;

the SIP subscription request message is a SIP SUBSCRIBE message;

the third type of SIP response message is a SIP 200 OK message; and the second type of SIP response message is a SIP return code.

13. The application server according to claim 7, further configured to perform the following:

store a SIP subscription-tunnel relation associating the requested SIP subscription and the requesting server with the existing established SIP tunnel; and access the stored SIP subscription-tunnel relation in response to receiving additional SIP subscription requests.

* * * * *